(12) United States Patent
Watts et al.

(10) Patent No.: US 9,095,935 B1
(45) Date of Patent: Aug. 4, 2015

(54) METHOD FOR HOLDING PARTS DURING MANUFACTURING PROCESSING

(75) Inventors: Michael L. Watts, Tacoma, WA (US); Mark Michael Walker, Bonney Lake, WA (US)

(73) Assignee: THE BOEING COMPANY, Chicago, IL (US)

( * ) Notice: Subject to any disclaimer, the term of this patent is extended or adjusted under 35 U.S.C. 154(b) by 951 days.

(21) Appl. No.: 13/165,354

(22) Filed: Jun. 21, 2011

Related U.S. Application Data

(63) Continuation-in-part of application No. 11/862,602, filed on Sep. 27, 2007, now Pat. No. 8,006,387.

(51) Int. Cl.
*B21D 53/88* (2006.01)
*B23K 37/04* (2006.01)

(52) U.S. Cl.
CPC ............ *B23K 37/04* (2013.01); *B23K 37/0461* (2013.01)

(58) Field of Classification Search
CPC .................. Y10T 29/49998; Y10T 29/49995; Y10T 29/49989
USPC ................ 29/559, 557, 527.6, 897.2; 269/55, 269/289 R, 243.53, 243.5, 243.56, 243.58, 269/238
See application file for complete search history.

(56) References Cited

U.S. PATENT DOCUMENTS

| | | | |
|---|---|---|---|
| 4,794,687 A * | 1/1989 | Peters et al. | 29/559 |
| 5,711,195 A * | 1/1998 | Koelling | 82/1.11 |
| 5,918,868 A * | 7/1999 | Bruchman | 269/238 |
| 6,743,079 B2 | 6/2004 | Bown et al. | |
| 7,270,505 B2 | 9/2007 | Vanderpol et al. | |
| 2004/0234352 A1 | 11/2004 | Vanderpol et al. | |
| 2006/0196035 A1 | 9/2006 | Opperman | |
| 2009/0084898 A1 | 4/2009 | Watts et al. | |

FOREIGN PATENT DOCUMENTS

| | | |
|---|---|---|
| DE | 202006011216 U1 | 2/2007 |
| JP | 8332572 A | 12/1996 |
| JP | 2003230985 A | 8/2003 |

OTHER PUBLICATIONS

UPSTO Office Action for U.S. Appl. No. 11/862,602 dated Feb. 1, 2010.
USPTO Final Office Action for U.S. Appl. No. 11/862,602 dated May 10, 2010.
USPTO Office Action for U.S. Appl. No. 11/862,602 dated Jul. 7, 2010.
USPTO Final Office Action for U.S. Appl. No. 11/862,602 dated Sep. 14, 2010.

* cited by examiner

*Primary Examiner* — Christopher Besler
(74) *Attorney, Agent, or Firm* — Yee & Associates, P.C.

(57) ABSTRACT

A method of processing. The method includes attaching a plurality of studs to a blank comprising a material having a first size approximating a second size of a part to be machined from the blank. The method also includes attaching a number of the plurality of studs to a tool tab. The method also includes attaching the tool tab to a tooling fixture. The method also includes removing material from the blank to form a finished part, wherein the plurality of studs remain attached to the blank during removing. The method also includes detaching the plurality of studs from the finished part.

10 Claims, 12 Drawing Sheets

METHOD FOR HOLDING PARTS DURING MANUFACTURING PROCESSING

CROSS-REFERENCE TO RELATED APPLICATION

This application is a continuation-in-part of patent application U.S. Ser. No. 11/862,602, filed Sep. 27, 2007, entitled "Method and Apparatus for Holding Parts During Manufacturing Processing", which is incorporated herein by reference.

BACKGROUND INFORMATION

1. Field

The present disclosure relates generally to manufacturing parts and in particular to a method and apparatus for holding parts during manufacturing processing.

2. Background

Manufacturing involves the use of tools and labor to produce or make things for use or sale. With this type of process, raw materials are transformed into finished goods or products, typically on a large scale. With the manufacturing of an aircraft, metal working combined with other operations, such as fatigue enhancement, chemical processing, and application of paint are often performed to create finished structures or machine parts. This metal working may include processes, such as milling, turning, cutting, drilling, and threading.

With these processes, it is common to hold a part in place while a particular process is being performed. For example, in creating a part, such as an air foil or frame for an aircraft, a block of raw material may be machined to form the component. This block of raw material is typically made of a metal, such as titanium, steel, or aluminum. This block of material is typically larger than the component being made. For example, in manufacturing a frame for a fuselage, a portion of the frame may be machined or cut out of a rectangular piece of titanium. The typical "buy to fly" ratio may be thirty to one in which twenty-nine pounds of material is machined into chips to create one pound of a part that is used on an aircraft.

For example, the size or amount of material needed for a particular part takes into account a need for sufficient material to machine or cut out sections that may be used to hold the part during manufacturing. Taking into account a need for sections that may be used to hold the part, the amount of material used to create the part increases. The amount of material needed includes more than just the sections for holding the part during manufacturing. The block of material also is large enough to allow for these components to be machined or created during the machining process.

SUMMARY

The different advantageous embodiments provide a method for processing parts. In one advantageous embodiment, a setoff set of studs are welded to a part to form a set of fixed studs. A set of tabs are attached to the set of fixed studs. The set of tabs are affixed to a manufacturing tool.

In another advantageous embodiment, a manufacturing system comprises a plurality of studs, a welding unit, a plurality of tabs, and a manufacturing tool. The welding unit is capable of rigidly attaching the plurality of studs to a part. The plurality of tabs is capable of being attached to studs in the plurality of studs. Each tab in the plurality of tabs has a channel to receive a portion of a stud and mechanically attach the stud to the tab. The manufacturing tool is capable of holding the part in place for processing using the plurality of tabs attached to the plurality of studs.

The advantageous embodiments also provide for a method of processing. The method includes attaching a plurality of studs to a blank comprising a material having a first size approximating a second size of a part to be machined from the blank. The method also includes attaching a number of the plurality of studs to a tool tab. The method also includes attaching the tool tab to a tooling fixture. The method also includes removing material from the blank to form a finished part, wherein the plurality of studs remain attached to the blank during removing. The method also includes detaching the plurality of studs from the finished part.

The advantageous embodiments also provide for a tool tab. The tool tab includes a tab comprising a material. A first slot is disposed through the tab and the first slot is further disposed such that the first slot exposes an opening in a first outer surface of the tab. The tool tab includes a first plug disposed within the first slot. The first plug is configured to slide within the first slot. The first plug further comprises an attachment mechanism configured such that a stud may connect to the first plug and extend outwardly from the first slot and through the opening.

The advantageous embodiments also provide for a self-aligning tool tab. The self-aligning tool tab includes a tab comprising a material. A first slot is disposed through the tab. The first slot is further disposed such that the first slot exposes an opening in a first outer surface of the tab. The tab further comprises a second slot through the tab and inside a second outer surface of the tab. The tab further comprises a third slot through the tab. The third slot creates an opening between the first slot and the second slot. The third slot is more narrow than both the first slot and the second slot. The self-aligning tool tab also includes a first plug disposed within the first slot. The first plug is configured to slide within the first slot. The first plug further comprises an attachment mechanism configured such that a stud may connect to the first plug and extend outwardly from the first slot and through the opening. The first plug is further configured to allow a degree of rotation of the first plug within the first slot. The self-aligning tool tab also includes a second plug disposed within the second slot. The second plug is connected to the first plug by a bridge of material extending through the third slot. The self-aligning tool tab also includes a first bar extending across the first slot and further disposed within the first slot to constrain movement of the first plug within the first slot. The self-aligning tool tab also includes a second bar extending across the first slot and further disposed within the first slot to constrain movement of the first plug within the first slot and also between the first bar and the second bar. The self-aligning tool tab also includes that the stud is connected to the first plug. The stud comprises a peg comprising a material suitable for welding to a metal part.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
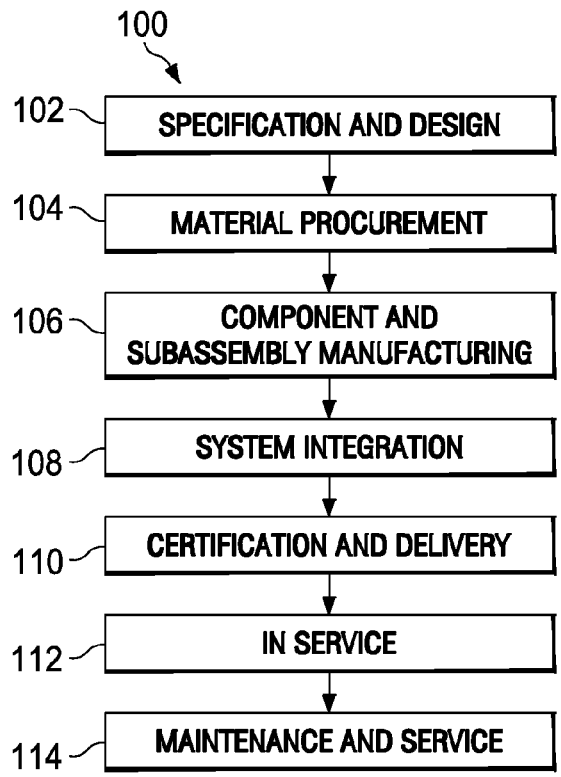
FIG. 1 is a diagram illustrating an aircraft manufacturing and service method in accordance with an advantageous embodiment.
Figure 2:
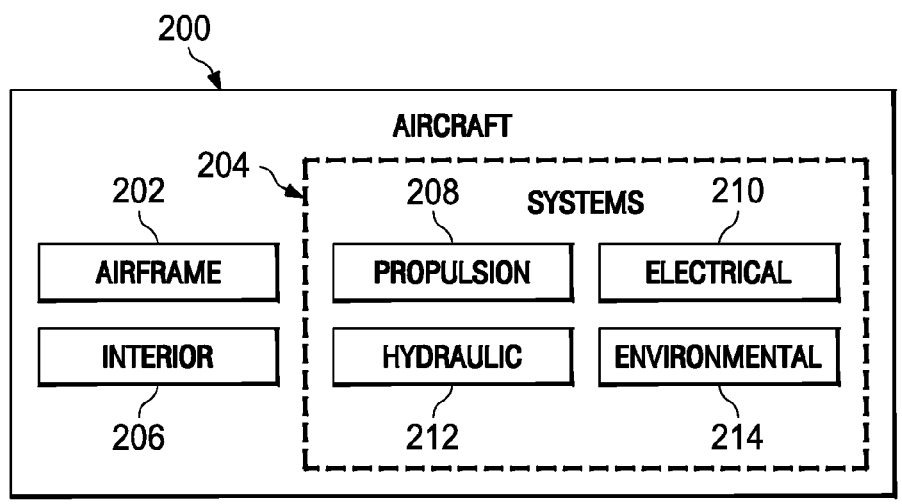
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112, for example and without limitation, to maintenance and service 114 in FIG. 1.

The different embodiments provide a method and apparatus for processing a part. In one advantageous embodiment, a set of studs are welded to a part to form a set of fixed studs. A set of tabs are attached to the set of fixed studs. The set of tabs are affixed to a manufacturing tool. This type of tab allows for less materials to be used in initially forming the part because additional material is not required to produce tabs on the part.

Figure 3:
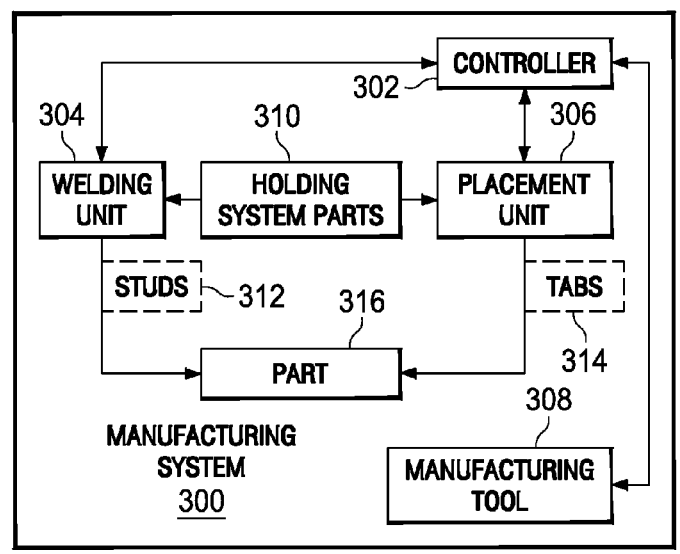
FIG. 3 is a block diagram illustrating components used to manufacture a part in accordance with an advantageous embodiment.

With reference next to FIG. 3, a block diagram illustrating components used to manufacture a part is depicted in accordance with an advantageous embodiment. In this example, manufacturing system 300 includes controller 302, welding unit 304, placement unit 306, manufacturing tool 308, and holding system parts 310. Studs 312 and tabs 314 are obtained from holding system parts 310. These different components are used to perform manufacturing processes on part 316.

Welding unit 304 may obtain studs 312 from holding system parts 310 and weld studs to part 316. Placement unit 306 obtains tabs 314 and attaches those tabs to studs 312. The combination of studs 312 and tabs 314 form a holding component used to hold part 316 when processing part 316 with manufacturing tool 308. Controller 302 controls welding unit 304, placement unit 306, and manufacturing tool 308. Controller 302 controls the application or welding of studs 312 by welding unit 304 to part 316. Further, controller 302 controls the attachment of tabs 314 by placement unit 306 to studs 312. Also, controller 302 may control the processing of part 316 by manufacturing tool 308.

In these examples, the different components are illustrated as functional components and may be implemented using a variety of different systems or personnel. For example, controller 302 may be a computer and/or human operator. Welding unit 304 may be a hand held welding unit. In other examples, welding unit 304 may be a robotic welding unit that automatically receives or feeds studs from holding system parts 310 into the welding unit for welding studs 312 to part 316. Placement unit 306 may be, for example, the same human operator as controller 302. In other embodiments, placement unit 306 may be a robotic system that obtains tabs 314 from holding system parts 310 and attaches tabs 314 to studs 312 on part 316.

Manufacturing tool 308 may take a variety of forms. For example, manufacturing tool 308 may be a computer, a robotic manufacturing tool, or a manufacturing tool operated by a human operator. Manufacturing tool 308 may be, for example, without limitation, a milling machine, a lathe, a cutting machine, a drilling and threading machine, a grinding machine, a welding machine, or a paint system.

Figure 4:
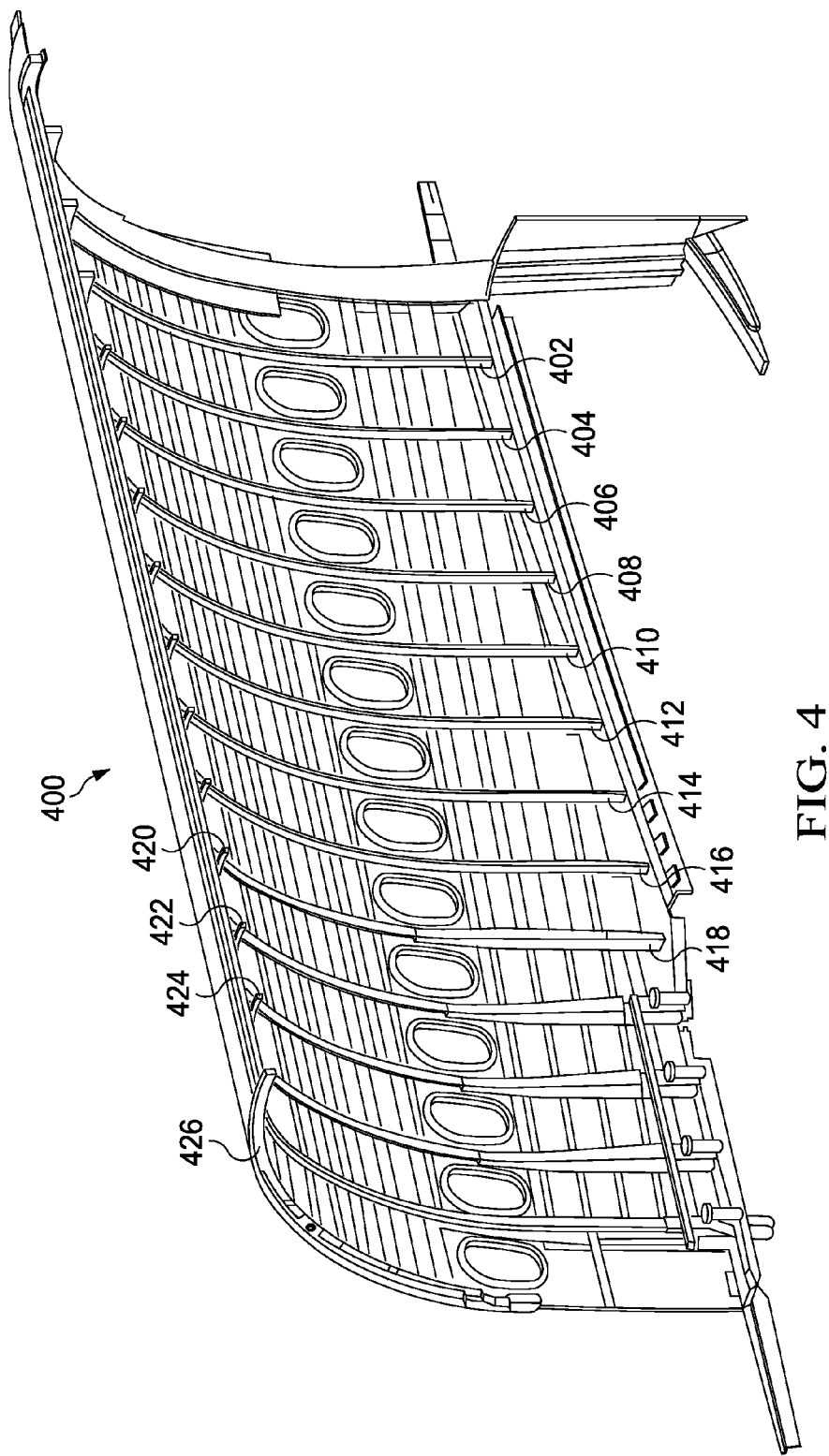
FIG. 4 is a diagram illustrating parts on which tabs may be implemented in accordance with an advantageous embodiment.

Turning now to FIG. 4, a diagram illustrating parts on which tabs may be implemented is depicted in accordance with an advantageous embodiment. In this example, structure 400 is a portion of a fuselage. Structure 400 includes side frames, such as frames 402, 404, 406, 408, 410, 412, 414, 416, 418, 420, 422, 424, and 426. These different parts may be manufactured within manufacturing system 300 in FIG. 3 using tabs.

Figure 5:
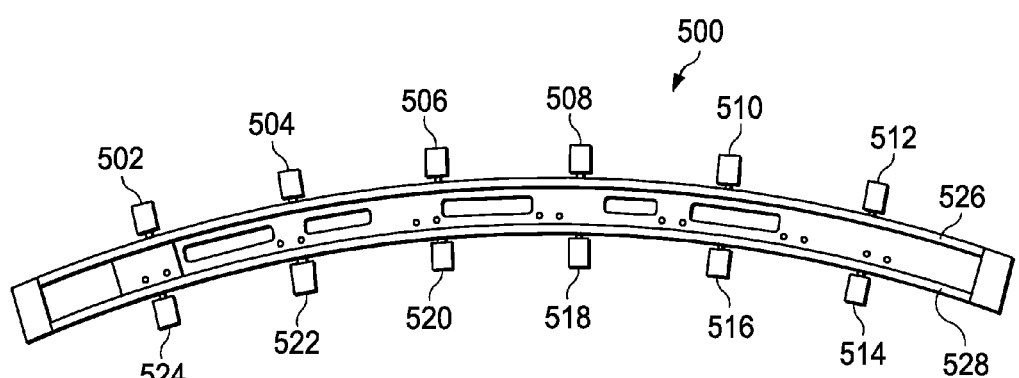
FIG. 5 is a diagram illustrating a frame with tabs in accordance with an advantageous embodiment.

With reference now to FIG. 5, a diagram illustrating a frame with tabs is depicted in accordance with an advantageous embodiment. In this example, frame 500 has tabs 502, 504, 506, 508, 510, 512, 514, 516, 518, 520, 522, and 524 attached on surface 526 and surface 528. These tabs are used to attach frame 500 to a manufacturing tool for processing. In these examples, the tabs are indirectly attached to surface 526 and surface 528. The tabs are mechanically attached or locked to studs that are not visible in this illustration. These studs are rigidly fixed to these surfaces.

Figure 6:
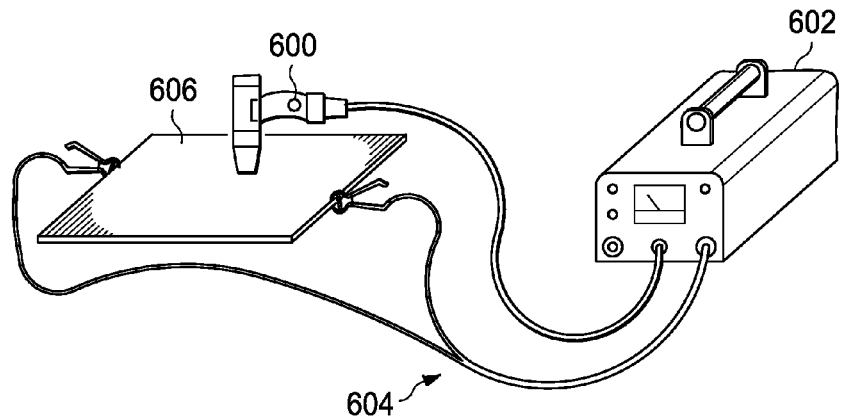
FIG. 6 is a diagram illustrating the welding of studs onto a part with a welding unit in accordance with an advantageous embodiment.

With reference now to FIG. 6, a diagram illustrating the welding of studs onto a part with a welding unit is depicted in accordance with an advantageous embodiment. In this example, stud gun 600 and welder 602 form welding unit 604, which is an example of welding unit 304 in FIG. 3. As depicted, welding unit 604 is a capacitor discharge stud welding unit. This type of welding unit performs capacitive welding and may be portable. Welding unit 604 is able to weld dissimilar materials to each other. Further, this type of welding is two times as fast as contact welding.

With a welding unit, such as welding unit 604, the portability provides for an ability to perform the welding of studs off line or away from an expensive machining center. This type of portability and flexibility allows for the attachment of studs to parts at different points or places. Further, capacitor discharge welding reduces the heat affected zone to a minimal amount. Thus, this type of welding ensures that all of the heat affected zone will be removed during the subsequent machining process. This removal of heat affected zones is performed to maintain part integrity on critical components.

Additionally, unlike friction welding, high contact forces are not needed with this type of welding. Of course, other types of welding, such as, for example, contact welding, friction welding, solid state welding, fusion welding, and diffusion welding also may be used, depending on the particular implementation.

In this particular example, part 606 is grounded in stud gun 600 and welds a stud onto part 606. Of course, other types of attachment processes other than welding may be used to attach a stud onto part other than welding. For example, without limitation, a stud could be adhesively attached to part 606.

Figure 7:
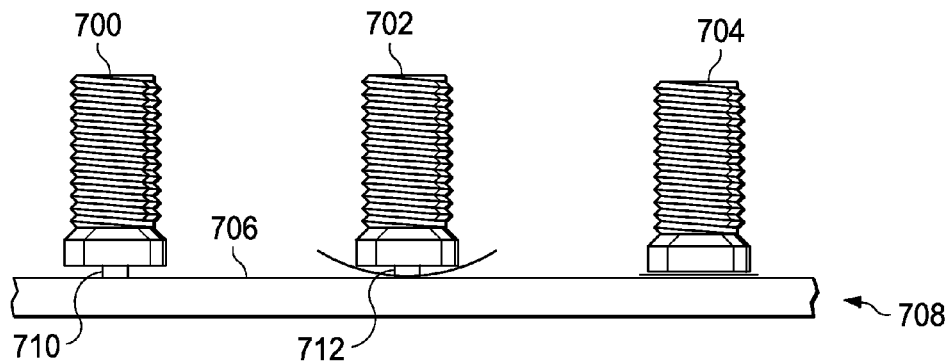
FIG. 7 is a diagram illustrating the welding of a stud onto a part in accordance with an advantageous embodiment.

Turning next to FIG. 7, a diagram illustrating the welding of a stud onto a part is depicted in accordance with an advantageous embodiment. In this example, stud 700 is ready to be welded onto part 708. In this example, studs 700, 702, and 704 are shown in different phases of being welded to surface 706 of part 708. In this example, tip 710 is in contact with surface 706 of part 708. Stud 702 illustrates a stud in which welding has begun. As can be seen, the material around tip 712 has begun to reflow. The welding causes the material at and around tip 712 to melt or reflow and coalesce with surface 706. Stud 704 illustrates a stud in which welding has been completed.

In these examples, the welding may take around 0.004 seconds to complete. Further the welding may be performed using a number of different types of energy sources. For example, a gas flame, an electric arc, a laser, an electron beam, friction, and an ultrasound are some non-limiting examples of energy sources that may be used to weld a stud to a part.

In these examples, the studs take the form of titanium studs. These studs may be applied to other metals, such as steel, aluminum, titanium, or other metal alloys. Further, the studs also may be made of different types of metals, depending on the particular embodiment.

With the use of studs, tabs may be attached to components with irregular cross-sections and/or complex shapes. Further, the attachment of tabs with studs may be performed off line from the machining area. This type of process provides flexibility as to when and where tabs may be attached to parts.

Figures 8, 9:
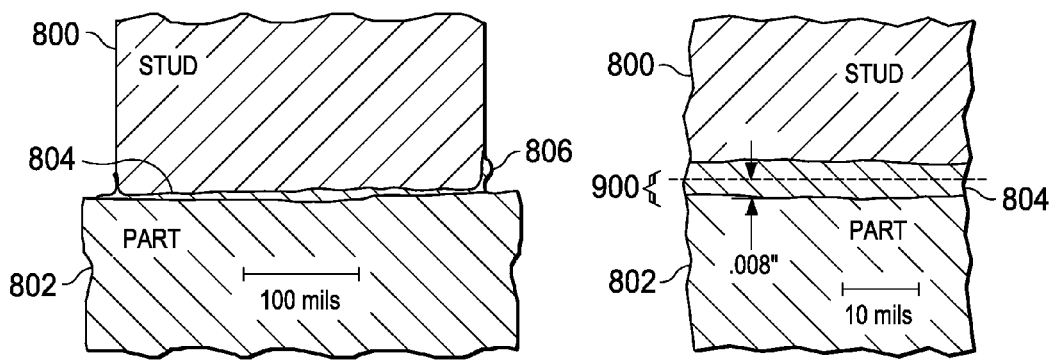
FIG. 8 is a cross-sectional view of a stud attached to a part in accordance with an advantageous embodiment.
FIG. 9 is a more detailed cross-sectional view of an interface between a stud and a part in accordance with an advantageous embodiment.

Turning now to FIG. 8, a cross-sectional view of a stud attached to a part is depicted in accordance with an advantageous embodiment. In this example, stud 800 has been welded to part 802. The welding is performed using capacitor discharge welding, in this example. This type of welding provides a minimal heat affected zone as compared to other types of welding processes.

Section 804 shows a fused area between stud 800 and surface 806 of part 802. In this example, part 802 is a titanium part.

Turning now to FIG. 9, a more detailed cross-sectional view of an interface between a stud and a part is depicted in accordance with an advantageous embodiment. In this example, the heat affected area in the part 802 is around 0.008 inches as can be seen in section 900. Section 804 is an area where fusion has occurred between stud 800 and part 802. The metals in both of these components may have melted and fused in this particular portion. In the different advantageous embodiments, the part is machined or processed to remove this material. In these examples, about 0.2 inches of excess material is typically included on the part periphery to ensure the heat affected zone is entirely machined away. Section 900 represents a heat affected zone to be machined away on the finished part.

Figure 10:
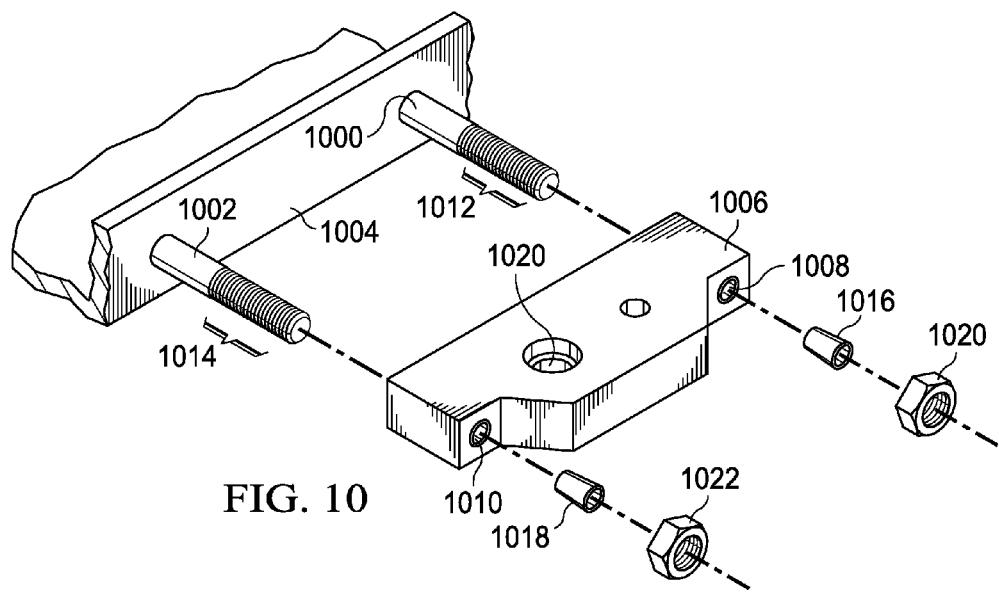
FIG. 10 is a diagram illustrating the placement of a tab onto a part in accordance with an advantageous embodiment.

With reference now to FIG. 10, a diagram illustrating the placement of a tab onto a part is depicted in accordance with an advantageous embodiment. In this example, studs 1000 and 1002 have been welded onto part 1004. At this point, tab 1006 may be attached to studs 1000 and 1002 by placing studs 1000 and 1002 into channels 1008 and 1010. Sections 1012 and 1014 are threaded sections for studs 1000 and 1002, respectively. These sections may be fastened to tab 1006 through fasteners 1020 and 1022. Tab 1006 is now rigidly attached to part 1004. Devices 1016 and 1018 ensure that a mechanical lock exists between tab 1006 to studs 1000 and 1002 when fasteners 1020 and 1022 are attached to studs 1000 and 1002.

Depending on the implementation, devices 1016 and 1018 may be omitted with fasteners 1020 and 1022 providing a feature for mechanical locking. As another non-limiting example, studs 1000 and 1002 also may take the form of a rivet, rather than having sections 1012 and 1014. Any mechanism for mechanically attaching studs 1000 and 1002 to tab 1006 may be used.

In this example, tab 1006 also includes channel 1020. This channel may be used with a fastener to fasten or affix tab 1006 to a manufacturing tool.

In this example, tab 1006 is attached to two studs, stud 1000 and stud 1002. In other embodiments, other numbers of studs may be used. For example, a single stud may be used with respect to tab 1006. In other embodiments, three studs may be used. Further, in these examples, devices 1018 and 1016 are shown as being fastened to sections 1012 and 1014 on studs 1000 and 1002.

In other embodiments, a fastener, such as fasteners 1020 are 1022 are unnecessary, as in the case where studs 1000 and 1002 are integral (one-piece) with tab 1006. Another embodiment might include a single stud with a threaded section may be placed into a channel in which the channel has a threaded surface or interior to attach the tab to the stud. Of course, other fastening mechanisms also may be used in addition to these.

Figure 11:
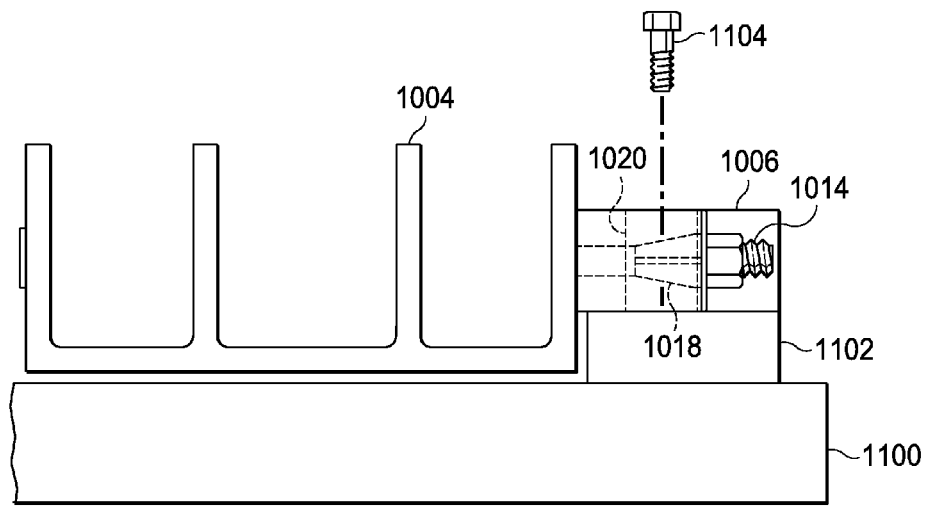
FIG. 11 is a diagram illustrating the holding of a part on a manufacturing tool in accordance with an advantageous embodiment.

Turning now to FIG. 11, a diagram illustrating the holding of a part on a manufacturing tool is depicted in accordance with an advantageous embodiment. In this example, part 1004 is placed onto machine tool table 1100, which is a part of a manufacturing tool. Tab 1006 is placed onto fastening block 1102 and bolt 1104 is placed through channel 1020 as shown in FIG. 10 to fasten tab 1006 to machine tool table 1100.

In this manner, the use for a larger block of material to create the machine tabs into part 1004 is unnecessary. As a result, less material is needed to form part 1004, in these examples. With this type of tab assembly, tab 1006 may be manufactured using a different type of material as compared to stud 1000 and 1002 in FIG. 10. Further, tab 1006 may be of a different type of material from part 1004. For example, tab 1006 may be made of a different type of metal or alloy as compared to part 1004. In addition, tab 1006 may even be made of non-metal materials, such as, for example, a plastic or composite material, depending on the particular implementation.

Figure 12:
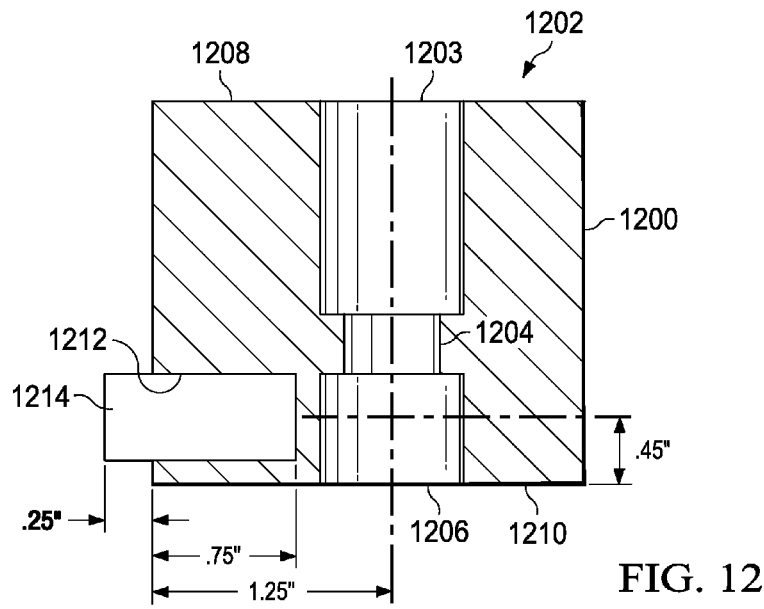
FIG. 12 is a diagram illustrating a cross-section of a tab in a stud in accordance with an advantageous embodiment.

Turning now to FIG. 12, a diagram illustrating a cross-section of a tab in a stud is depicted in accordance with an advantageous embodiment. In this example, tab 1200 includes channel 1202, which has different diameters or radii through tab 1200. Channel 1202 has a first diameter in section 1203, a second diameter in section 1204, and a third diameter in section 1206. In this example, sections 1203 and 1206 have the same diameter. Section 1203 and section 1206 have wider diameters than section 1204, in these examples. Sections 1203 and 1206 in channel 1202 are designed to allow the head of a fastener, such as a bolt, to be placed completely within channel 1202 such that the head of the bolt or other fastener does not protrude or extend above surface 1208 or surface 1210 when tab 1200 is fastened to a manufacturing tool or other structure.

In this example, tab 1200 also includes channel 1212 through which stud 1214 may be inserted. In these particular examples, another fastener is unnecessary because channel 1212 is threaded to receive stud 1214.

As illustrated, tab 1200 is around 1.75 inches wide and around two inches tall. Further, tab 1200 also includes section 1216. This is a machined section, which may be removed during processing of the part. In other words, section 1216 may be machined away from tab 1200 during the processing of this part with a manufacturing tool.

Figure 13:
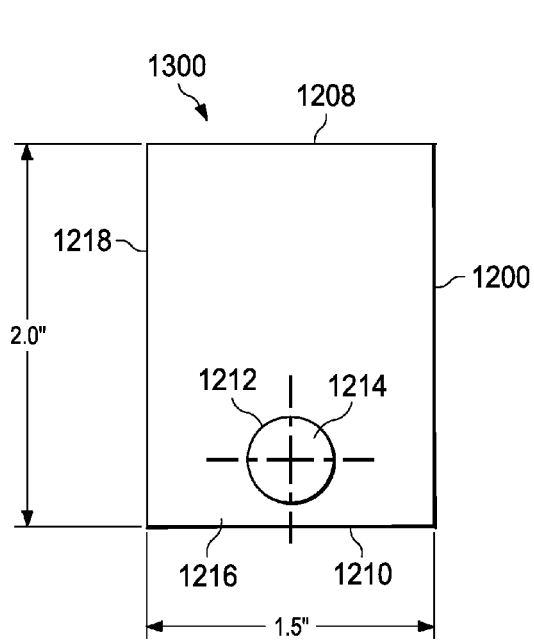
FIG. 13 is a front view of a tab in accordance with an advantageous embodiment.

Turning now to FIG. 13, a front view of a tab is depicted in accordance with an advantageous embodiment. Channel 1212 with stud 1214 is visible from this view of tab 1200. In this example, surface 1300 is around 1.5 inches wide.

The different dimensions and configurations in these figures are provided as an illustrative example of one advantageous embodiment and not meant to limit the configuration or dimensions that may be used. For example, a tab may include two channels for fasteners. The channels also do not have to be round or circular. A portion of the channel or all of the channel could have a hexagonal or octagonal shape. Thus, the different dimensions described and shown may vary, depending on the implementation. Further, tabs of different sizes or dimensions may be attached to the same part.

Figure 14:
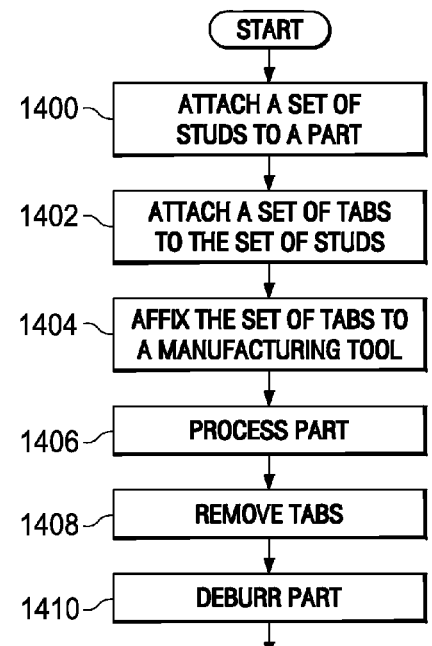
FIG. 14 is a flowchart of a process for manufacturing a part in accordance with an advantageous embodiment.

Turning now to FIG. 14, a flowchart of a process for manufacturing a part is depicted in accordance with an advantageous embodiment. The process begins by attaching a set of studs to a part (operation 1400). In these examples, the studs are rigidly attached to the part through a welding process. The set of tabs are one or more tabs, in these examples. The part may have been initially processed or formed through processes, such as, for example, without limitation, extrusion, machining, and water jet cutting.

Next, a set of tabs are attached to the set of studs (operation 1402). The set of studs are one or more studs, in these examples. Depending on the particular implementation, one tab may be attached to one stud. In other examples, a tab may be attached to two or more studs. The tabs may be attached to studs through a fastener or through threads located in the channel in the tabs.

After the set of tabs have been attached to the studs, the set of tabs are affixed to a manufacturing tool (operation 1404). Thereafter, the part is processed using the manufacturing tool (operation 1406). This processing may include, for example, drilling, machining, lathing, or painting.

After the part has been processed, the tabs may be removed (operation 1408). The tabs may be removed by applying a bending/shearing type force to the tabs to cause the studs to snap off. The tabs, in these examples, are easier to remove because they are not formed as part of the part. Additional, the tab itself is not welded to or directly affixed to the part. The studs have a smaller area, as compared to the tab, that is attached to the part. The studs may be undercut at the completion of machining or processing such that they may be more easily removed or "snapped" off by hand rather than if the tab itself was attached or welded to the part. Current processes, in which tabs are formed on the part, require machining or other processing to remove the tabs from the part.

Thereafter, the part may be deburred to remove any rough surfaces on the part left from the attachment of the stud (operation 1410). The process then terminates.

Thus the different embodiments provide a method and apparatus for processing a part. In one advantageous embodiment, a setoff set of studs are welded to a part to form a set of fixed studs. A set of tabs are attached to the set of fixed studs. The set of tabs are affixed to a manufacturing tool.

As a result, some or all of the different advantageous embodiments provide for an ability to reduce the amount of material needed for a part. This reduction in the needed amount of material for a part occurs in some of the advantageous embodiments because the amount of material needed for the part does not have to take into account machining or forming tabs as part of the part. Instead, the tabs may be attached through the attachment of studs to the part. Tabs are then attached to the studs to provide for a component to hold the part to a manufacturing tool for processing. Further, this type of configuration allows for flexibility in the location of tabs as well as a modular configuration of tabs. Further, different types of tabs may be attached to the same part, depending on the type of holding mechanism needed.

Figure 15:
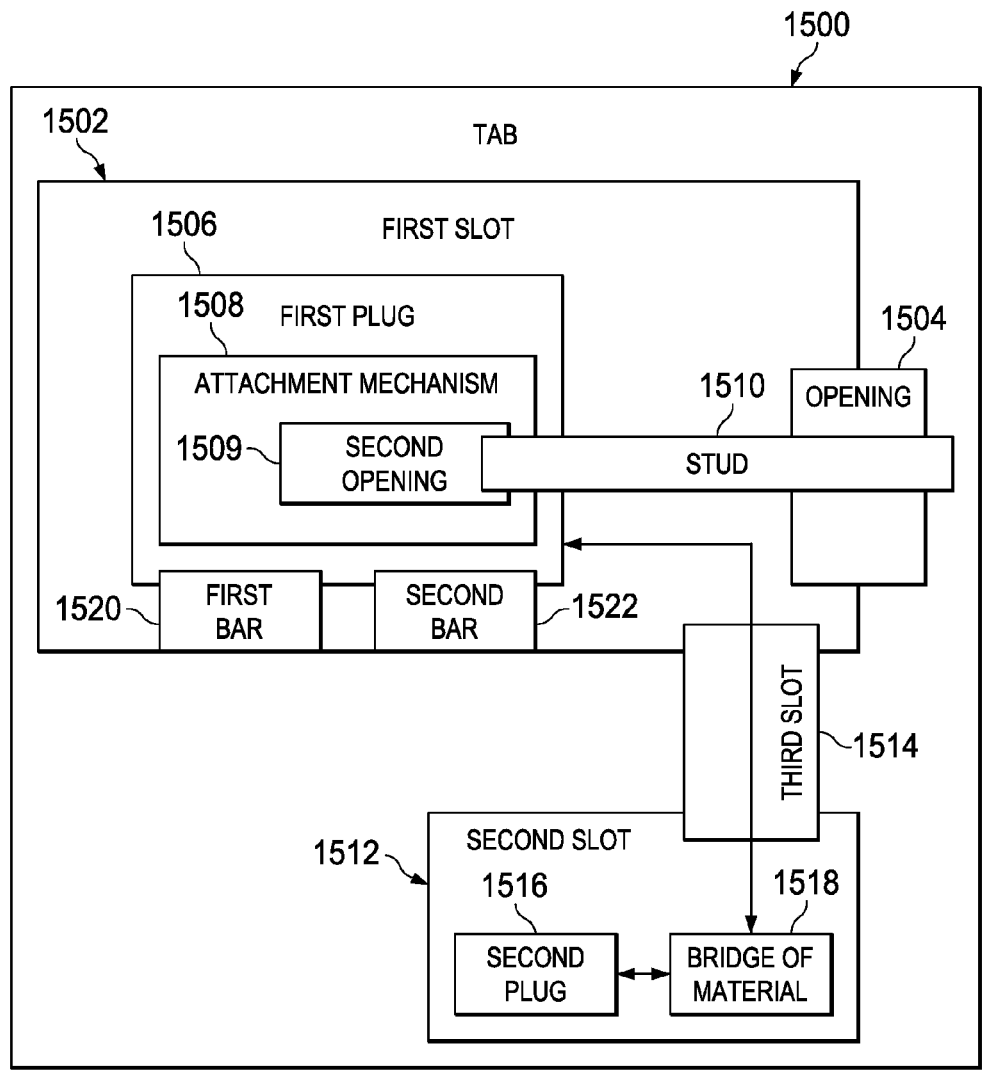
FIG. 15 is a block diagram of a tab, in accordance with an advantageous embodiment.

FIG. 15 is a block diagram of a tab, in accordance with an advantageous embodiment. Tab 1500 may be an alternative embodiment of the tabs described above, such as tabs 314 of FIG. 3, tabs 502 through 524 of FIG. 5, tab 1006 of FIG. 10, tab 1200 of FIG. 12, and others. In an advantageous embodiment, tab 1500 may be considered a tool tab.

Tab 1500 may be composed of a solid material. Although tab 1500 is often a metallic material, such as titanium or aluminum, tab 1500 may also be a plastic, a ceramic, a composite, or any other suitable material. First slot 1502 is disposed through tab 1500. First slot 1502 is further disposed such that first slot 1502 exposes opening 1504 in a first outer surface of tab 1500.

Tab 1500 may include first plug 1506, which may be disposed within first slot 1502. First plug 1506 may be configured to slide within first slot 1502. First plug 1506 may further include attachment mechanism 1508 configured such that stud 1510 may connect to first plug 1506 and extend outwardly from first slot 1502 and through opening 1504.

In an advantageous embodiment, tab 1500 may further include second slot 1512 that extends through tab 1500 and inside a second outer surface of tab 1500. Tab 1500 may further include third slot 1514 through tab 1500. Third slot 1514 may create second opening 1509 between first slot 1502 and second slot 1512. Third slot 1514 may be more narrow than both first slot 1502 and second slot 1512, though the advantageous embodiments are not limited to a more narrow third slot 1514.

In an advantageous embodiment, tab 1500 may further include second plug 1516 disposed within second slot 1512. Second plug 1516 may be connected to first plug 1506 by bridge of material 1518, which may extend through third slot 1514.

In an advantageous embodiment, tab 1500 may include first bar 1520, which extends across first slot 1502 and is further disposed within first slot 1502 to constrain movement of first plug 1506 within first slot 1502. Tab 1500 may further include second bar 1522, which also extends across first slot 1502 and is further disposed within first slot 1502 to constrain movement of first plug 1506 within first slot 1502 and also between first bar 1520 and second bar 1522. More or fewer bars may be present to constrain movement of first plug 1506 within first slot 1502 in a desired manner.

In an advantageous embodiment, first plug 1506 may be further configured to allow a degree of rotation of first plug 1506 within first slot 1502. Thus, for example, first plug 1506 may have a round shape, such as a spherical or partially spherical shape, such that first plug 1506 may rotate partially or fully within first slot 1502. To rotate fully, another opening (not shown) may be placed within tab 1500 such that stud 1510 may rotate three hundred and sixty degrees within tab 1500. Furthermore, the size and shape of opening 1504 and/or second opening 1509 may be varied in order to change the manner and degree to which first plug 1506 may rotate within tab 1500.

For example, first plug 1506 and/or first slot 1502 may be configured such that first plug 1506 may move linearly within first slot 1502. In another example, first plug 1506 and first slot 1502 have circular cross sections such that first plug 1506 and/or stud 1510 may rotate within tab 1500. First plug 1506 may be, for example, a spherical joint. The size and shape of first slot 1502 and the positioning, size, or shape of first bar 1520 and/or second bar 1522 may be configured to allow stud 1510 to be angled up or down with respect an orientation of tab 1500, and such angle may be variable in some advantageous embodiments.

In an advantageous embodiment, attachment mechanism 1508 may take different forms. For example, attachment mechanism 1508 may be second opening 1509 in first plug 1506. Second opening 1509 may be configured to receive stud 1510. For example, second opening 1509 may be a partially or fully threaded hole that receives a partially or fully threaded stud, such that stud 1510 may be screwed into second opening 1509.

Attachment mechanism 1508 may take different forms. Attachment mechanism 1508 may also be a peg that replaces second opening 1509 and extends outwardly from first plug 1506. In this case, stud 1510 may be connected to the peg. For example, a hole in stud 1510 may connected to the peg.

Other advantageous embodiments are possible for attachment mechanism 1508. For example, stud 1510 may be clamped, glued, welded, or in some other manner attached to attachment mechanism 1508. Thus, the advantageous embodiments for attachment mechanism 1508 are not limited to the examples given above.

Other alternative advantageous embodiments are possible for tab 1500. For example, tab 1500 may be a self-aligning tool tab. As used herein, the term "self-aligning" means that when the tool tab is attached to a blank, additional substantial alignment relative to the blank and the tool tab is unnecessary because the act of attaching the tool tab to the blank results in a substantially proper alignment between the blank and the tool tab. Tab 1500 may also be varied from the examples given above.

For example, tab 1500 may be a self-aligning tool tab that is composed of a material, such as a metal or other hard substance. First slot 1502 may be disposed through tab 1500. First slot 1502 may be further disposed such that first slot 1502 exposes opening 1504 in a first outer surface of the tab. The tab may further include second slot 1512 through the tab and inside a second outer surface of the tab. The tab may further include third slot 1514 through the tab. Third slot 1514 may create an opening between first slot 1502 and second slot 1512. Third slot 1514 may be more narrow than both first slot 1502 and second slot 1512.

In an advantageous embodiment, first plug 1506 may be disposed within first slot 1502. First plug 1506 may be configured to slide within first slot 1502. First plug 1506 may further include attachment mechanism 1508 configured such that stud 1510 may connect to first plug 1506 and extend outwardly from first slot 1502 and through opening 1504. First plug 1506 may be further configured to allow a degree of rotation of first plug 1506 within the first slot 1502.

In an advantageous embodiment, second plug 1516 may be disposed within second slot 1512. Second plug 1516 may be connected to first plug 1506 by bridge of material 1518 extending through third slot 1514.

In an advantageous embodiment, first bar 1520 may extend across first slot 1502 and be further disposed within first slot 1502 to constrain movement of first plug 1506 within first slot 1502. Optionally, second bar 1522 may extend across first slot 1502 and be further disposed within first slot 1502 to constrain movement of first plug 1506 within first slot 1502 and also between first bar 1520 and second bar 1522. Stud 1510 may be connected to first plug 1506. Stud 1510 may be a peg comprising a material suitable for welding to a metal part.

The advantageous embodiments shown in FIG. 15 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 16:
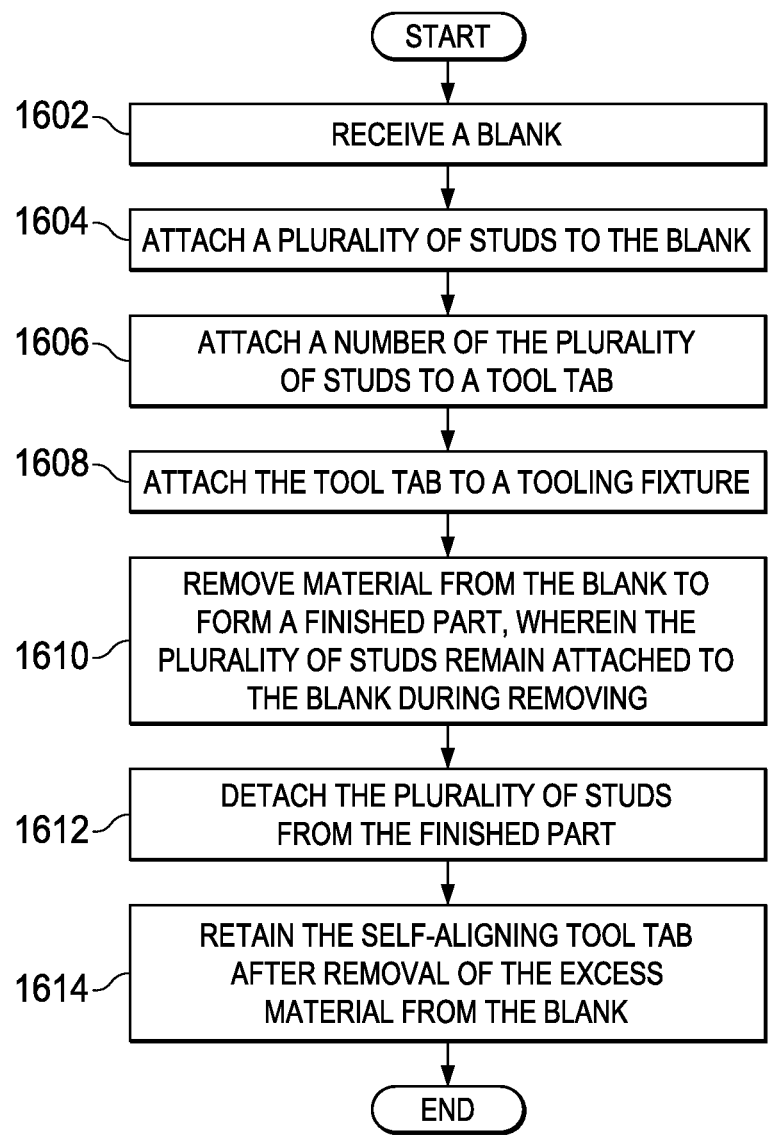
FIG. 16 is a flowchart of a process for manufacturing a part, in accordance with an advantageous embodiment.

FIG. 16 is a flowchart of a process for manufacturing a part, in accordance with an advantageous embodiment. The process shown in FIG. 16 may be implemented using a tab, such as tab 1500 of FIG. 15. The process shown in FIG. 16 may also be used with respect to tool tabs 1704 in FIG. 17, and tool tab 1800 in FIG. 18 and tool tab 1900 in FIG. 19. The process shown in FIG. 16 may also be used with respect to the various tool tabs shown in FIG. 1 through FIG. 14. The operations described with respect to the flowchart shown in FIG. 16 may be performed by a machine or by a human operator.

In an advantageous embodiment, the process begins with receiving a blank (operation 1602). Next, a plurality of studs is attached to the blank (operation 1604). The blank may comprise a material having a first size approximating a second size of a part to be machined from the blank. A number of the plurality of studs is then attached to a tool tab (operation 1606). The tool tab is then attached to a tooling fixture (operation 1608). Material is removed from the blank to form a finished part, wherein the plurality of studs remain attached to the blank during removing (operation 1610). The plurality of studs may be detached from the finished part (operation 1612). Optionally, the self-aligning tool tab may be retained after removal of the excess material from the blank (operation 1614). The process terminates thereafter.

The method described with respect to FIG. 16 is not limited to the advantageous embodiments described above, and may be varied and may include more or fewer details. For example, detaching the plurality of studs may be configured to avoid removal of a substantial amount of the excess material from the blank. The blank may be a metallic material. The blank may be an envelope of the finished part. The tool tab may be a self-aligning tool tab. The self-aligning tool tab may be configured to eliminate a requirement to shim the blank during set-up on the tooling fixture. The self-aligning tool tab may be configured to reduce a precision needed to attach the plurality of studs to the blank. Other variations are possible.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 17:
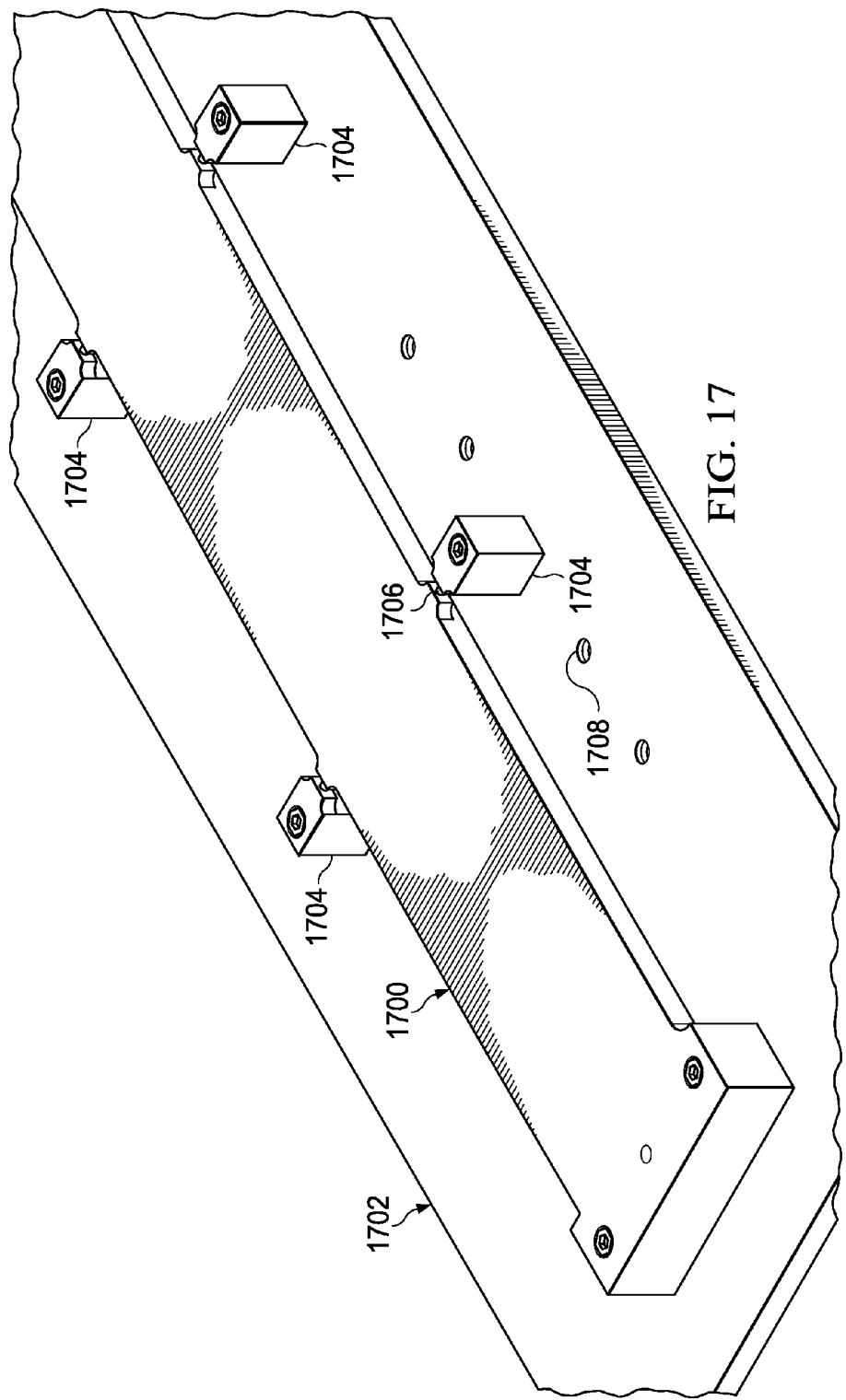
FIG. 17 is diagram of a part to be machined, to which is attached a number of tool tabs, in accordance with an advantageous embodiment.

FIG. 17 is diagram of a part to be machined, to which is attached a number of tool tabs, in accordance with an advantageous embodiment. Frame 1700 may be frame 500 of FIG. 5. Frame 1700 may be attached to blank 1702, which may be the blanks described in operations 1602 and 1604 in FIG. 16, and which may correspond to surface 706 of part 708 in FIG. 7. Attached to frame 1700 and blank 1702 may be tool tabs 1704. Tool tabs 1704 each may be examples of a tab or a self-aligning tool tab, such as tab 1500 of FIG. 15 or as described with respect to operations 1606, 1608, or 1614 of FIG. 16. Tool tabs 1704 may also be examples of tabs 502 through 524 in FIG. 5, as well as described elsewhere herein.

As described above, tool tabs 1704 may be attached to frame 1700 and/or blank 1702 by any convenient means. In an advantageous embodiment, tool tabs 1704 may be attached to frame 1700 by welding corresponding studs, such as stud 1706, onto frame 1700. In an advantageous embodiment, tool tabs 1704 may be attached to blank 1702 by means of a bolt which may be, for example, attached to a hole in blank 1702, such as hole 1708. However, these mechanisms for attaching tool tabs 1704 to either frame 1700 or blank 1702 may be varied and are not limited to these advantageous embodiments.

Figure 18:
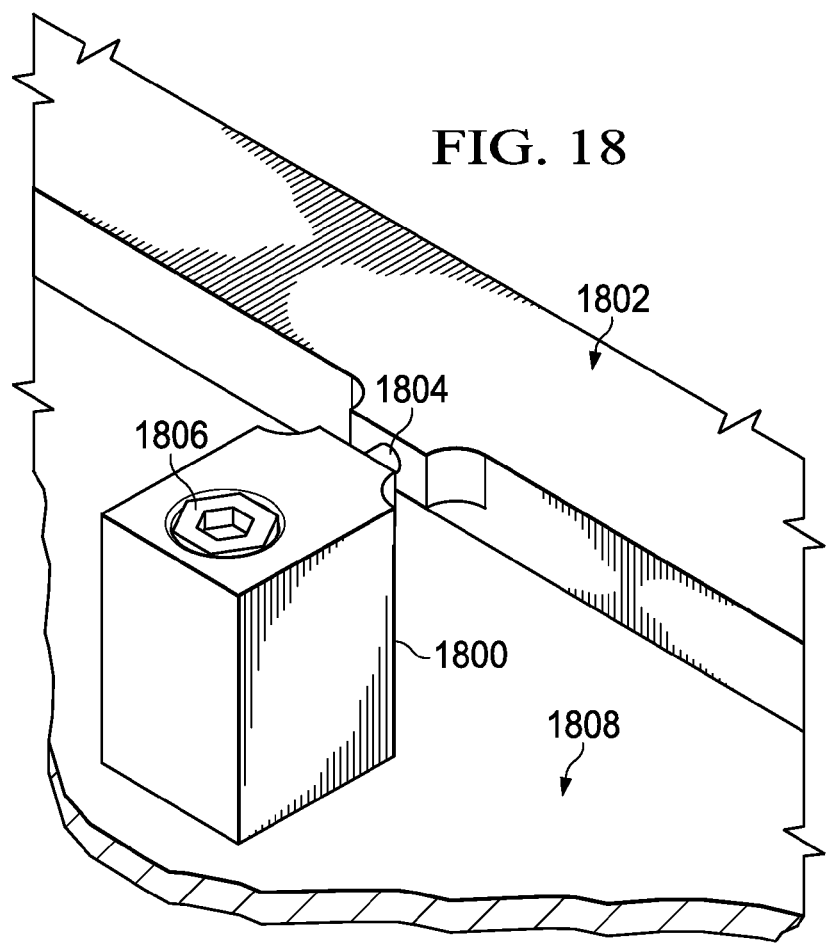
FIG. 18 is a diagram of a tool tab attached to a part to be machined, in accordance with an advantageous embodiment.

FIG. 18 is a diagram of a tool tab attached to a part to be machined, in accordance with an advantageous embodiment. Tool tab 1800 may be an exploded view of one of tool tabs 1704 in FIG. 17. Tool tab 1800 also may be as described elsewhere herein, such as tab 1500 of FIG. 15, or as described with respect to operations 1606, 1608, or 1614 of FIG. 16, or with respect to any of tabs 502 through 524 of FIG. 5. Tool tab 1800 may be attached to frame 1802 via stud 1804. Bolt 1806 may be used to attach tool tab 1800 to blank 1808.

Figure 19:
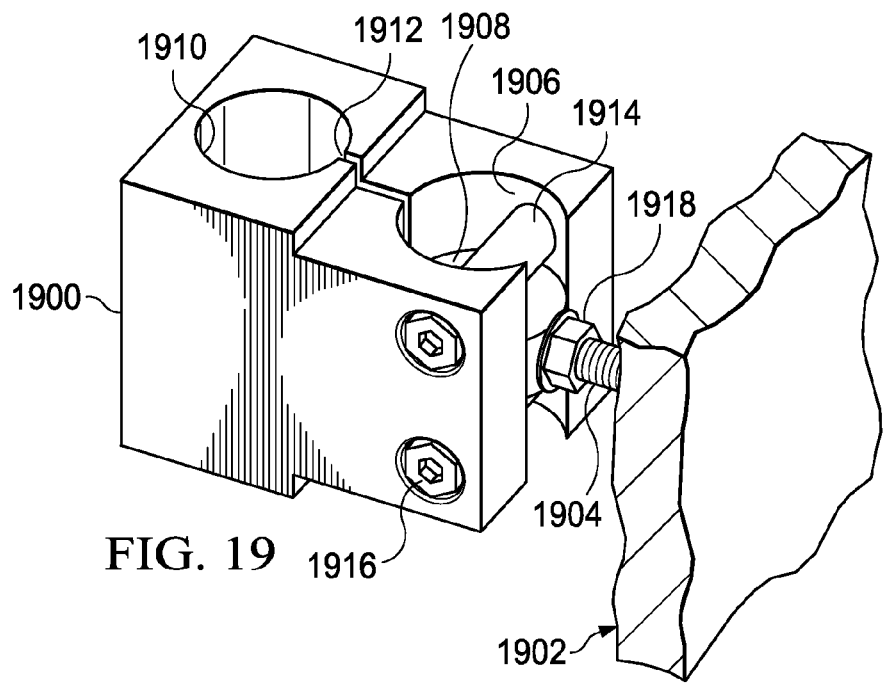
FIG. 19 is a diagram of a tool tab attached to a part to be machined, in accordance with an advantageous embodiment.

FIG. 19 is a diagram of a tool tab attached to a part to be machined, in accordance with an advantageous embodiment. Tool tab 1900 may be an alternative view of tool tab 1800 of FIG. 18 or any of tool tabs 1704 of FIG. 17. Tool tab 1900 also may be as described elsewhere herein, such as tab 1500 of FIG. 15, or as described with respect to operations 1606, 1608, or 1614 of FIG. 16, or with respect to any of tabs 502 through 524 of FIG. 5. Tool tab 1900 may be attached to frame 1902 via stud 1904.

Various components described with respect to FIG. 15 may also be seen in tool tab 1900 of FIG. 19. For example, stud 1904 may be stud 1510 of FIG. 5. First slot 1906 may be first slot 1502 of FIG. 5. First plug 1908 may be first plug 1506 of FIG. 5. Second slot 1910 may be second slot 1512 of FIG. 5. Third slot 1912 may be third slot 1514 of FIG. 5. First bar 1914 may be first bar 1520 of FIG. 5. Second bar 1916 may be second bar 1522 of FIG. 5. Attachment mechanism 1918 may be attachment mechanism 1508 of FIG. 5. As shown in FIG. 19, attachment mechanism 1918 may be a threaded bolt that is fitted into a threaded hole (not shown) in tool tab 1900.

The various components shown in FIG. 17, FIG. 18, and FIG. 19 may be arranged and used as described with respect to FIG. 15 and FIG. 16. However, the advantageous embodiments are not limited to the configurations and uses described with respect to FIG. 15 through FIG. 19.

Figure 20:
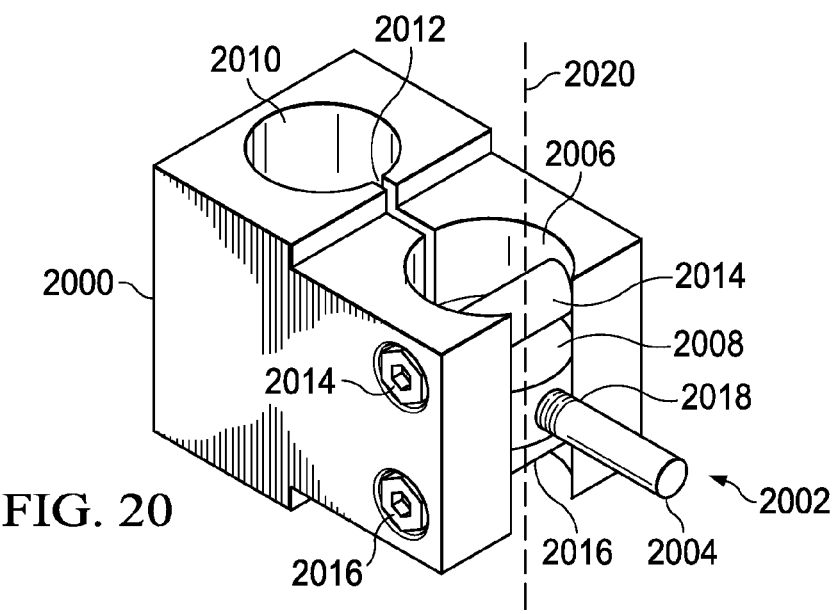
FIG. 20 is a diagram of a tool tab, in accordance with an advantageous embodiment.

FIG. 20 is a diagram of a tool tab, in accordance with an advantageous embodiment. Tool tab 2000 may be an alternative view of the other tool tabs described herein, such as tool tab 1900 of FIG. 19, tool tab 1800 of FIG. 18, or any of tool tabs 1704 of FIG. 17. Tool tab 2000 also may be as described elsewhere herein, such as tab 1500 of FIG. 15, or as described with respect to operations 1606, 1608, or 1614 of FIG. 16, or with respect to any of tabs 502 through 524 of FIG. 5.

Various components described with respect to FIG. 15 may also be seen in tool tab 2000 of FIG. 20. For example, stud 2004 may be stud 1510 of FIG. 5. First slot 2006 may be first slot 1502 of FIG. 5. First slot 2006 may create opening 2002 in an outer surface of tool tab 2000. First plug 2008 may be first plug 1506 of FIG. 5. As shown in FIG. 15, first plug 2008 may have a circular cross section, or may be partially spherical in shape. This shape may configure first plug 2008 to be able to rotate within first slot 2006. In this manner, tool tab 2000 may be resistant to misalignment errors with respect to the orientation of tool tab 2000 with respect to a part to be machined.

Second slot 2010 may be second slot 1512 of FIG. 5. Third slot 2012 may be third slot 1514 of FIG. 5. First bar 2014 may be first bar 1520 of FIG. 5. Second bar 2016 may be second bar 1522 of FIG. 5. In an advantageous embodiment, first plug 2008 is slidable within first slot 2006 between first bar 2014 and second bar 2016. In an advantageous embodiment, first plug 2008 may slide along an axis parallel to axis 2020 of first slot 2006. First bar 2014 and second bar 2016 may constrain the movement of first plug 2008 along the axis parallel to axis 2020. Thus, first plug 2008 may slide along an axis parallel to axis 2020 to accommodate part distortion. In this manner, the use of shims, between either tool tab 2000 and the part or workpiece, or between tool tab 2000 and a tooling machine or tooling table, may be avoided when the part or work piece is flipped over for machining on the opposite side of the part or workpiece.

Attachment mechanism 2018 may be attachment mechanism 1508 of FIG. 5. As shown in FIG. 20, attachment mechanism 2018 may be a hole in first plug 2008 configured to receive stud 2004. Stud 2004 may be detachable and in some advantageous embodiments disposable and replaceable.

Figure 21:
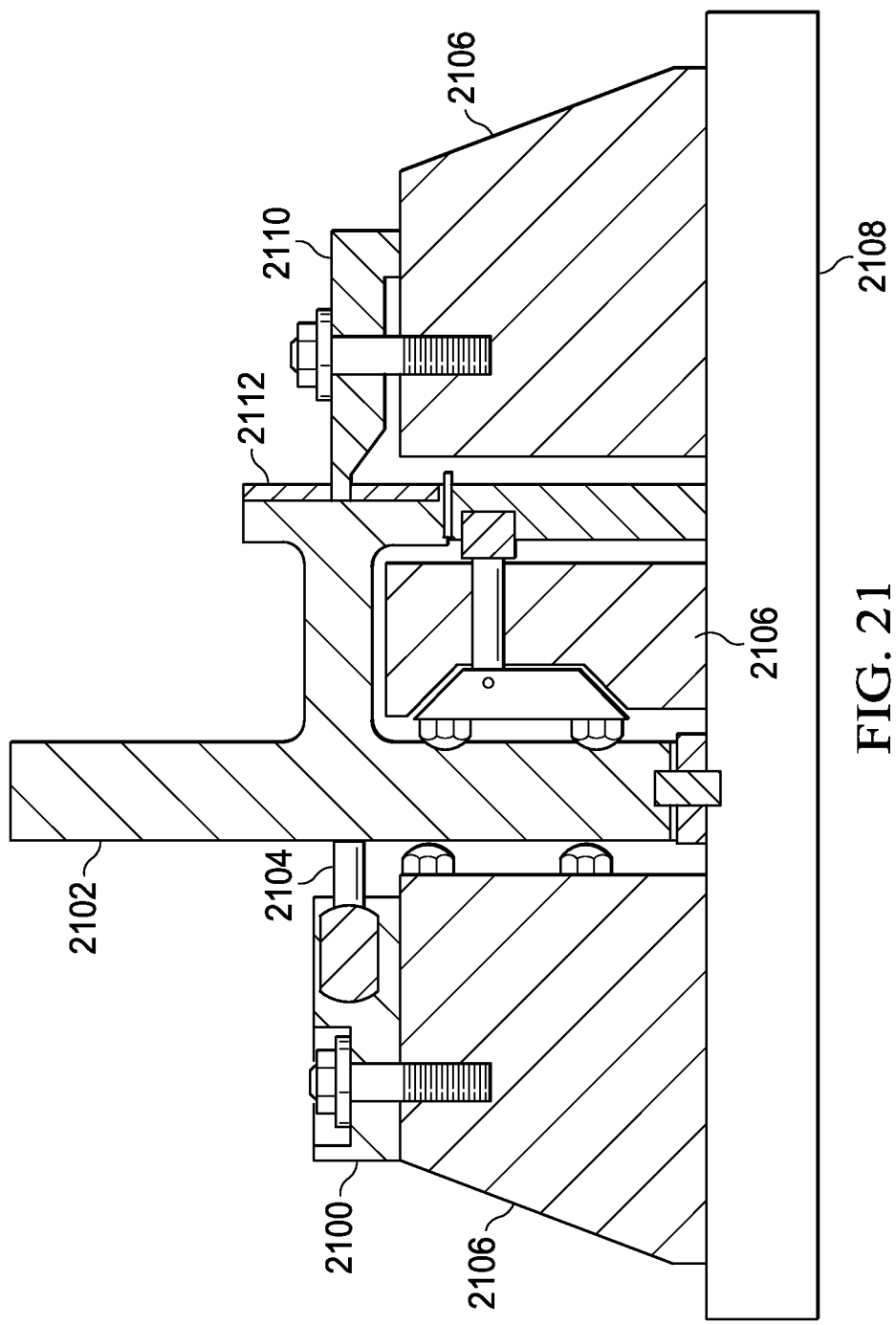
FIG. 21 is a diagram of a tool tab in use, in accordance with an advantageous embodiment.

FIG. 21 is a diagram of a tool tab in use, in accordance with an advantageous embodiment. Tool tab 2100 may be an alternative view of the other tool tabs described herein, such as tool tab 2000 of FIG. 20, tool tab 1900 of FIG. 19, tool tab 1800 of FIG. 18, or any of tool tabs 1704 of FIG. 17. Tool tab 2100 also may be as described elsewhere herein, such as tab 1500 of FIG. 15, or as described with respect to operations 1606, 1608, or 1614 of FIG. 16, or with respect to any of tabs 502 through 524 of FIG. 5.

As shown in FIG. 21, tool tab 2100 may be attached to blank 2102 via stud 2104. Blank 2102 eventually may be machined into a finished part, such as but not limited to frame 500 of FIG. 5. The process of machining may be implemented using machining tool 2106, which may rest on tool table 2108. In an advantageous embodiment, use of tool tab 2100 to hold blank 2102 prevents any excess material from being removed from blank 2102 during the machining process.

This advantage stands in contrast to use of a clamping technique, such the use of strap clamp 2110. Strap clamp 2110 also may be used to connect machining tool 2106 to blank 2102. However, use of strap clamp 2110 requires that excess material, indicated by the hashed area at arrow 2112, be removed from blank 2102 during the machining process. This excess material must be purchased. The excess material at arrow 2112 thus wastes money and material. Excess material must also be handled, adding to the time and expense of the manufacturing process.

For example, when constructing certain commercial jet aircraft, it may be common to generate one to two hundred thousand pounds of excess material in the form of titanium chips and unused portions of blanks that are machined away from parts during machining and manufacturing of the parts. Thus, up to two hundred thousand pounds of titanium that is purchased may be wasted or have to be recycled, and two hundred thousand pounds of titanium must be handled and properly disposed of or recycled. At a cost between about $20 and $50 a pound in the year 2011, plus the cost of handling, two hundred thousand pounds of wasted titanium per commercial jet aircraft may represent a large expense that a business may desire to avoid.

Furthermore, part clamps may interfere with machining operations by being "in the way." Furthermore, part clamps may be moved either manually or automatically when the cutter passes the area where the clamp is located. Epoxy glued-on clamps require curing time and do not offer equivalent strength in comparison to welded studs. Both of these methods often require additional excess material be purchased.

A vacuum clamp often is not sufficiently strong to support high cutting forces involved with machining metals unless a significant amount of surface area exists. Additionally, vacuum fixturing may be costly to fabricate and if the part distorts during the machining operation, it can be problematic to obtain a good vacuum seal. Often traditional clamps are also required along with additional excess material.

Linear friction welding on tabs require expensive equipment, place high force on parts to perform welding process, create significant flash at joint, require part holding fixture to hold part for welding, and is a slow process compared to stud welding. Linear friction welding on tabs also requires higher amounts of material than welded studs and self-aligning tool tabs, as described above.

Excess raw material stock and machining part holding features may be purchased, which may be used to hold parts during machining operations. However, this method may be expensive because it requires additional material and increases the excess material.

Furthermore, all of the above described methods, except the advantageous embodiments described herein, require shimming to account for part distortion when the part is flipped over to machine the back side. The advantageous embodiments avoid this problem and avoid or mitigate the other problems of the part fixturing methods described above.

Additionally, the advantageous embodiments use a floating spherical seat, as described above, which is attached to the welded stud. A reusable part holding a tab accepts and clamps the sphere yet allows unrestricted movement for alignment of the tab to a fixed base plate on the machine tool until the sphere is firmly locked in place. Furthermore, when non-symmetrical parts are machined, part movement may result due to residual stress contained in the part. The stress may be relieved during the machining process. Normally this stress release would require the operator to carefully shim the part such that the distortion could be machined out. However, with the advantageous embodiments described herein, when the part is flipped over to machine the alternate side the sphere is unclamped and then re-clamped into a new position which compensates for any part distortion, eliminating the need for shims. Additionally, using the advantageous embodiments, the only consumed material during machining is the inexpensive welded stud. The self-aligning tool tab is reusable for the next blank to be machined.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method comprising:

attaching a plurality of studs to a blank comprising a material having a first size approximating a second size of a part to be machined from the blank;

thereafter attaching the plurality of studs to a tool tab, wherein the tool tab comprises a plurality of first slots oriented at a first angle with respect to an axis of the tool tab, wherein each of the plurality of slots receives one of the plurality of studs, wherein the tool tab further comprises a second slot configured to receive a bolt, wherein the second slot is oriented at a second angle with respect to the axis, wherein the first angle is different than the second angle;

attaching the tool tab to a tooling fixture by inserting the bolt through the second slot and securing the bolt to the tooling fixture;

removing a portion of the material from the blank to form a part, wherein the plurality of studs remain attached to the blank during removal of the portion of the material; and detaching the plurality of studs from the part to form a finished part.

2. The method of claim 1, wherein detaching the plurality of studs avoids removal of a substantial amount of excess material from the blank.

3. The method of claim 1, wherein the blank comprises a metallic material.

4. The method of claim 1, wherein the blank comprises an envelope of the finished part.

5. The method of claim 1 further comprising:

receiving the blank.

6. The method of claim 1, wherein the tool tab comprises a self-aligning tool tab.

7. The method of claim 6, wherein the self-aligning tool tab is configured to eliminate a requirement to shim the blank during set-up on the tooling fixture.

8. The method of claim 6, wherein the self-aligning tool tab is configured to reduce a precision needed to attach the plurality of studs to the blank.

9. The method of claim 6, further comprising:

retaining the self-aligning tool tab after removal of the material from the blank.

10. The method of claim 1, wherein attaching the plurality of studs to the blank comprises welding the plurality of studs to the blank.

* * * * *